US010997012B2

(12) United States Patent
Athmaram et al.

(10) Patent No.: US 10,997,012 B2
(45) Date of Patent: May 4, 2021

(54) IDENTIFYING DEFECTIVE FIELD-REPLACEABLE UNITS THAT INCLUDE MULTI-PAGE, NON-VOLATILE MEMORY DEVICES

(71) Applicant: International Business Machines Corporation, Armonk, NY (US)

(72) Inventors: Krishna Swaroop Athmaram, Bengaluru (IN); Santosh Puranik, Bangalore (IN); Jinu J. Thomas, Bangalore (IN)

(73) Assignee: International Business machines Corporation, Armonk, NY (US)

( * ) Notice: Subject to any disclaimer, the term of this patent is extended or adjusted under 35 U.S.C. 154(b) by 404 days.

(21) Appl. No.: 16/024,068

(22) Filed: Jun. 29, 2018

(65) Prior Publication Data
US 2020/0004621 A1    Jan. 2, 2020

(51) Int. Cl.
*G06F 11/07* (2006.01)
*G06F 11/30* (2006.01)

(52) U.S. Cl.
CPC ........ *G06F 11/0793* (2013.01); *G06F 11/079* (2013.01); *G06F 11/0727* (2013.01); *G06F 11/0766* (2013.01); *G06F 11/3034* (2013.01); *G06F 11/3058* (2013.01)

(58) Field of Classification Search
CPC ................................................ G06F 11/0793
See application file for complete search history.

(56) References Cited

U.S. PATENT DOCUMENTS

| 5,446,668 | A | * | 8/1995 | Herbert | ............ G07B 17/00362 |
| | | | | | 705/405 |
| 7,168,007 | B2 | | 1/2007 | Gilstrap et al. | |
| 9,336,111 | B1 | | 5/2016 | King et al. | |
| 9,569,306 | B1 | | 2/2017 | Camp et al. | |
| 9,582,350 | B2 | | 2/2017 | Boecker et al. | |
| 9,804,921 | B2 | | 10/2017 | Suto | |
| 2012/0185637 | A1 | * | 7/2012 | Boecker | ................... G06F 8/656 |
| | | | | | 711/103 |

(Continued)

OTHER PUBLICATIONS

Grace Period Disclosure—"IBM Power System S924 server helps deliver high security and reliability and is now cloud-enabled with integrated virtualization capabilities", IBM United States Hardware Announcement 118-020, Feb. 13, 2018, 66 pages, https://w3-01.ibm.com/sales/ssi/cgi-bin/ssialias?htmlfid=897/ENUS118-020&infotype=AN&subtype=IA&appname=w3skm.

(Continued)

*Primary Examiner* — Manuel A Rivera Vargas
(74) *Attorney, Agent, or Firm* — Daniel R. Simek

(57) ABSTRACT

A method for managing hardware within a computing system. The method includes at least one computer processors identifying a plurality of field-replaceable units (FRUs) within a computing system that respectively include a non-volatile memory device. The method further includes determining a status corresponding to a FRU of the identified plurality of FRUs. The method further includes responding to determining a non-functional status of the FRU of the identified plurality of FRUs, by determining a response related to the non-functional FRU. The method further includes initiating an action on the computing system based on the determined response related to the non-functional FRU.

20 Claims, 4 Drawing Sheets

(56) References Cited

U.S. PATENT DOCUMENTS

2016/0098310 A1* 4/2016 Boecker .............. G06F 11/0772
                                                              707/769

OTHER PUBLICATIONS

Grace Period Disclosure—"IBM Power System S924 server helps deliver high security and reliability and is now cloud-enabled with integrated virtualization capabilities", IBM United States Hardware Announcement 118-020, Feb. 13, 2018, 70 pages, http://w3-01.ibm.com/sales/ssi/rep_ia/0/897/ENUS118-020/ENUS118-020.PDF.

"Powering on or migrating a virtual machine fails with the error: Virtual Disk 'X' is a mapped direct access LUN that is not accessible (1016210)", my vmware, Last Updated: Apr. 18, 2018, 8 pps., <https://kb.vmware.com/s/article/1016210>.

* cited by examiner

IDENTIFYING DEFECTIVE FIELD-REPLACEABLE UNITS THAT INCLUDE MULTI-PAGE, NON-VOLATILE MEMORY DEVICES

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) "IBM Power System S924 server helps deliver high security and reliability and is now cloud-enabled with integrated virtualization capabilities", IBM United States Hardware Announcement 118-020, Feb. 13, 2018, 66 pages, https://w3-01.ibm.com/sales/ssi/cgi-bin/ssialias?htmlfid=897/ENUS118-020&infotype=AN&subtype=IA&appname=w3skm; and (ii) "IBM Power System S924 server helps deliver high security and reliability and is now cloud-enabled with integrated virtualization capabilities", IBM United States Hardware Announcement 118-020, Feb. 13, 2018, 70 pages, http://w3-01.ibm.com/sales/ssi/rep_ia/0/897/ENUS118-020/ENUS118-020.PDF.

BACKGROUND OF THE INVENTION

The present invention relates to the field of electronic devices that incorporate field-replaceable units (FRUs) that include non-volatile memory, and more particularly identifying a failing FRU based on inspecting the non-volatile memory.

In early computer systems and electronic devices, it was often difficult or even impossible to replace certain hardware components, e.g., the power supply, memory, and I/O controllers, after the computer or electronic device had been manufactured. Electronic hardware components in computer systems and electronic devices sometimes fail after the systems have been put into service. When hardware failures occur, the faulty device must be identified and replaced to minimize downtime. Modern computer systems and electronic devices incorporate field-replaceable units (FRUs), which are components, such as a power supply, memory, and I/O controllers that can be replaced in the field (i.e., at user locations) to minimize downtime.

Most computing environments today include several types of memory for storing and manipulating data. The most common are read-only memory (ROM), random-access memory (RAM), programmable read-only memory (PROM), and erasable programmable read-only memory (EPROM or Flash memory). FRUs can include one or more types of memory to store: firmware, vital product data (VPD), monitoring data, and/or fault data. Some FRUs may include non-volatile memory that is a discrete component, such as a serial electrically EPROM (SEEPROM) and/or memory that is part of another device, such as flash memory of a microcontroller.

SUMMARY

According to an aspect of the present invention, there is a method, computer program product, and/or system for managing hardware within a computing system. In an embodiment, the method includes one or more computer processors identifying a plurality of field-replaceable units (FRUs) within a computing system that respectively include a non-volatile memory device. The method further includes determining a status corresponding to a FRU of the identified plurality of FRUs. The method further includes responding to determining a non-functional status of the FRU of the identified plurality of FRUs, by determining a response related to the non-functional FRU. The method further includes initiating an action on the computing system based on the determined response related to the non-functional FRU.

DETAILED DESCRIPTION

Figure 1:
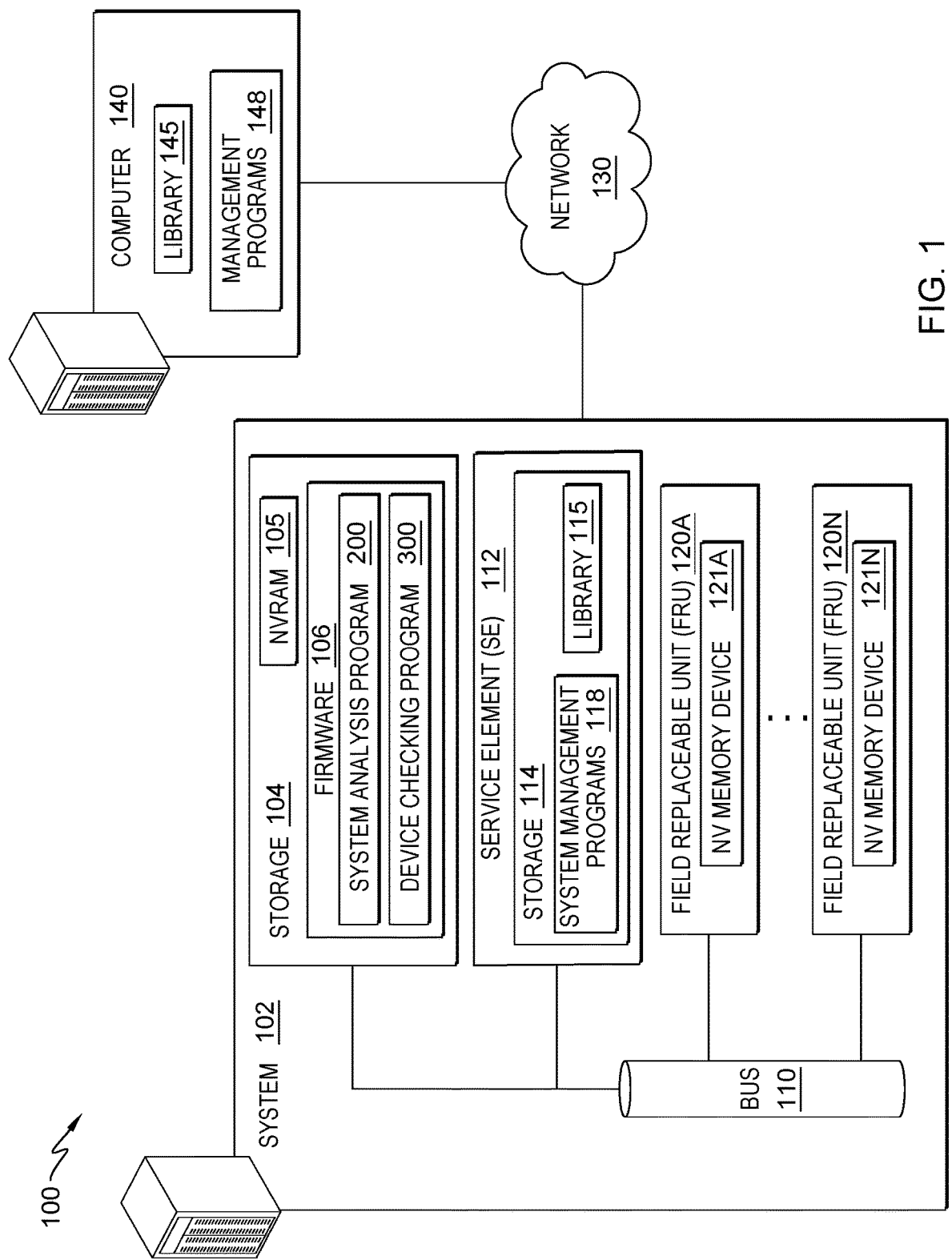
FIG. 1 illustrates a computing environment incorporating a field-replaceable unit (FRU) within a computing device, in accordance with an embodiment of the present invention.

Embodiments of the present invention recognize that if a field-replaceable unit (FRU) fails within a computing system, then the monitoring hardware and/or software of the computing system can identify some types of failed FRUs, especially if the FRU performs a monitored function, such as supplying power or providing cooling to the computing system. Some FRUs that have not completely failed and produce errors within the computing system are more difficult to identify especially if the FRU is part of a group of similar FRUs that share a control/monitoring common bus, such as a bank (i.e., array) of dual in-line memory modules (DIMMs). In addition, different FRU-types may communicate with the monitoring hardware and software of the computing system via dedicated internal communication networks and/or busses, such as a power FRU may utilize a power management bus (PMBus).

A computing system may include various FRUs that utilizes other busses, such as a system management bus (SMBus), an inter-integrated circuit bus (I²C bus), and a low pin count bus (LPC Bus). Embodiments of the present invention recognize that without a methodology to identify/isolate a failed or failing FRU that replacing multiple FRUs utilizing (i.e., sharing) a bus is not cost effective. Similarly, downtime of the computing system is increased in response to utilizing multiple power-on tests to individually isolate and replace failed or failing FRU; thereby affecting customers. Some FRUs require a service representative to replace/repair. Other FRUs, designated as CRUs (customer-replaceable units) may be replaced by a technician, an engineer, or another trained individual of a customer that owns/leases a computing system.

Embodiments of the present invention utilize a methodology to identify one or more failed or failing (e.g., error prone, unstable) FRUs by accessing data stored within a multi-page, non-volatile memory device of a FRU. In an embodiment, a multi-page, non-volatile memory device of a FRU stores one or more types of memory for the FRU, such as firmware, vital product data (VPD), and environmental data. An example of a non-volatile memory device that can include multiple memory pages, as used herein, is a serial electrically erasable programmable read-only memory (SEEPROM). Some FRUs may include more than one multi-page non-volatile memory device, such as a microcontroller and a SEEPROM, which in turn can communicate within a computing system via different busses.

Embodiments of the present invention distribute information related to the FRU, such vital product data, as an image (e.g., file) that spans the multi-page memory of the non-volatile memory device included in a FRU, as opposed to filling one page and possibly leaving another page empty. By distributing the VPD as an image across the memory pages of the non-volatile memory device, embodiments of the present invention can determine a status of functional or non-functional for a FRU based on tests that detect various conditions that affect the non-volatile memory device, such as page-shifting errors and read errors. Embodiments of the present invention utilize the architecture of a hardware bus that connects multiple FRUs, to determine whether all FRUs of a group of FRUs are assigned a status of non-functional.

Some embodiments of the present invention are included within licensed internal code (LIC), a system-level computing code (i.e., software) that: manages the communications with the FRUs within a computing device, performs cyclic monitoring, and logs data from each FRU. The LIC may be specific to a FRU-type (e.g., a power FRU or a memory FRU) or associated with a type of bus, such as an $I^2C$ bus. Various embodiments of the present invention are implemented as firmware or stored on von-volatile random-access memory (NVRAM) that activates in response to powering-up the computing system or during a boot sequence of the computing system. Other embodiments of the present invention can be implemented as software installed on a service element (SE) that interfaces with the computing system but can operate independently from the computing system, such as a laptop computer.

Further, embodiments of the present invention can operate at various hardware levels based on the configuration of the computing system. In an example, the computing system may be distributed among a plurality of racks and where one or more racks are further segmented into drawers. In some instances, a drawer of the computing system may be a self-contained computing device (i.e., a server) that includes power, memory, communication, storage, and specialty (e.g., accelerator) FRU. In other instances, a drawer of the computing system may be devoted to a specific task such as networking or storage and include a plurality of one FRU-type, a lesser quantity some FRU-types, and/or lack of other FRU-types. Embodiments of the current invention can operate at a system-level, a rack-level, and/or a drawer-level. In one example, an embodiment of the current invention can identify failed or failing FRU in response to a power-on or reboot of the computing system. In another example, an embodiment of the current invention can identify failed or failing FRU in response to powering on a drawer, such as the computing system activating additional resources in response to an increased workload.

Another embodiment of the present invention may inspect FRU during a power-down cycle in preparation to idle or shut down a portion of the computing system, thus enabling the detection and replacement of failed or failing FRU during a period of time that minimizes the impacts to users of the computing system. Other embodiments of the present invention can operate in parallel to inspect various FRUs while the computing system is running because in some instances the busses that access the non-volatile memory device(s) of FRUs are different from the busses utilized by the computing system to perform tasks, execute computational operations, and interconnect various components. In an example, in response to reading a multi-page data image from the SEEPROM of a FRU to inspect VPD, an embodiment of the present invention can utilize the herein described tests to verify the status of one or more FRUs.

As one skilled in that art will appreciate, embodiments of the preset invention can be implemented within older computing systems that include busses that utilize for FRU communicating with service elements, in addition to new computing system that support the current invention. In response to replacing older FRUs without non-volatile storage devices with FRUs that include non-volatile storage devices, monitoring of a computing system is enhanced. In addition, by distributing data, such as VPD as an image across all the memory pages of a non-volatile storage device of a FRU, errors and failures related to page-shifting are identified. Further, the computing system is improved by implementing embodiments of the present invention at various operational levels thereby enabling the identification of failed or failing FRUs at different stages of the operation of the computing system.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating computing environment 100 in an embodiment, in accordance with the present invention. An embodiment of computing environment 100 includes system 102 and computer 140 interconnected over network 130. Many modifications to the depicted environment may be made by those skilled in the art without departing from the scope of the invention as recited by the claims.

System 102 and computer 140 may be laptop computers, tablet computers, system consoles, personal computers (PCs), personal digital assistants (PDAs), smart phones, wearable devices (e.g., digital eyeglasses, smart glasses, a smart watch), or any programmable computer systems known in the art. In some embodiments, system 102 and computer 140 represent computer systems utilizing clustered computers and components (e.g., database server computers, application server computers, file server computer, network-attached storage devices, etc.) that act as a single pool of seamless resources when accessed through network 130, as is common in data centers and with cloud-computing applications. In general, system 102 and computer 140 are representative of any programmable electronic devices or combination of programmable electronic devices capable of executing machine readable program instructions and communicating via network 130. System 102 and computer 140 may include components, as depicted and described in further detail with respect to FIG. 4, in accordance with embodiments of the present invention.

System 102 includes storage 104, NVRAM 105, firmware 106, bus 110, service element (SE) 112, and a plurality of FRUs represented by FRU 120A through FRU 120N. In an embodiment, system 102 includes a plurality of additional computing resources and hardware (not shown) that are utilized by customers of system 102 and are not associated with embodiments of the current invention (e.g., devices or FRUs that lack multi-page non-volatile memory devices for storing VPD). Some examples of other computing resources and hardware include: central processing units (CPUs); communication devices; volatile memory devices, such as random-access memory (RAM); and pluralities of persistent storage, such as hard-disk drives and solid-state drives; cabling; and cooling devices (not shown). In various embodiments, system 102 includes multiple instances of SE 112, such as one service element per rack.

In one embodiment, storage 104 includes non-volatile random-access memory (NVRAM) 105, firmware 106, and various programs and data (not shown). Examples of programs that storage 104 may include are: a hypervisor (e.g., a type II hypervisor), a communication program, virtualization software, one or more operating systems, a load-balance program, a flash memory utility, programs of users, etc. Examples of data that storage 104 may include are: one or more communication protocols, environmental and operational data related to system 102, configuration files associated with the hardware of system 102, virtual machine templates, container files, etc. In another embodiment, each portion (e.g., rack) of system 102 can include respective instances of storage 104, NVRAM 105, firmware 106, system analysis program 200, and device checking program 300.

In some embodiments, NVRAM 105 stores a subset of information from library 115 related to the FRUs of system 102, such as an ID, bus identifier, and a corresponding FRU-type for each FRU. In an embodiment, NVRAM 105 is implemented as a flash memory device that can be updated by system management programs 118 and/or management programs 148 of system 140 as FRUs are replaced, reconfigured, and/or added to system 102. In various embodiments, NVRAM 105 may also include cross-reference information that identifies a location within system 102 for each FRU. In an example, information within NVRAM 105 may identify a memory FRU as a DIMM, in slot 4 of bank 3, and drawer 10 of rack A.

Firmware 106 may be stored on various persistent storage devices, such as a flash memory device. In an embodiment, firmware 106 includes microcode, a bootloader, a hypervisor (e.g., a type I hypervisor), a software licensing description table, etc. In some embodiments, firmware 106 also includes an instance of system analysis program 200 and device checking program 300. Including an instance of system analysis program 200 and device checking program 300 within firmware 106 enables system 102 to check (e.g., test) FRU during power-up or booting of system 102 or a portion of system 102.

In some embodiments, bus 110 is representative of one or more physical busses that enables communication of operational information among one or more FRU-types represented by FRU 120A through FRU 120N, SE 112 and/or firmware 106. Bus 110 may include wiring harnesses and printed wiring boards (e.g., backplanes). In an example, a portion of computing system 102 may include an array of DIMMs that utilizes an I²C for communicating with SE 112 or a controller (not shown) of system 102. In addition, the one or more commands utilized to specify or set a memory page may differ among FRUs based on the included non-volatile memory device. For example, NV memory device 121A of a respective FRU 121A may utilize different commands than NV memory device 121G of a respective FRU 121G In one embodiment, SE 112 is representative of an interface and/or monitoring console included within one or more portions of system 102. In another embodiment, SE 112 is representative of a control/monitoring computer related to system 102. As such, SE 112 may include components, as depicted and described in further detail with respect to FIG. 4, in accordance with embodiments of the present invention. In an example, SE 112 is a laptop computer that can interface with various portions of a system wired (e.g., Ethernet, USB) and/or wirelessly.

SE 112 includes storage 114, which further includes library 115, system management programs 118, and various programs and data (not shown). Examples of programs that SE 112 may include are: a web browser, a database management program, a flash memory utility, an e-mail program, a graphic user interface, etc. In various embodiments, SE 112 includes a copy of system analysis program 200 and/or device checking program 300. In an example, the copies of system analysis program 200 and/or device checking program 300 associated with SE 112 execute while system 102 is active or in response to a portion of system 102 (e.g., racks, drawers) powering up, idling, or reactivating. SE 112 can initiate some actions determined by system analysis program 200, such as actions defined within library 115. In an alternative embodiment, SE 112 includes instances of system analysis program 200 and device checking program 300 as aspects of system management programs 118. In other embodiments, SE 112 includes a plurality of instances of library 115, such as different instances for each instance of system 102 within a data center, or an instance for each rack of system 102.

Library 115 includes information associated with the FRUs of system 102. An instance of library 115 may include information specific to the instance of SE 112 that stores the instance of library 115. The information of library 115 may be stored within a data structure, such as a table, a list, an associative array or other data structure known in the art. Library 115 may include a copy of the information stored within NVRAM 105. In one embodiment, library 115 includes additional information, such as the physical location corresponding to each FRU ID stored within NVRAM 105. In some embodiments, library 115 includes a combination of information associated with the FRUs of system 102 that includes, but is not limited to, information for a plurality of FRUs, such as an ID, FRU-type, bus and bus ID that operatively couple a group of FRUs, and physical location for each FRU. In various embodiments, library 115 includes rules (e.g., criteria, hierarchies, decision trees, sequences, etc.) associated with identifying and testing one or more groups of FRUs. Library 115 may also include responses and associated rules used to determine which responses are selected based on which FRUs are flagged with a status of non-functional, the number of each type of non-functional FRU, and the corresponding locations of the non-functional FRUs. A response may include an action, a priority, a sequence of events, a message (e.g., a notification), or a combination thereof. Library 115 may include various responses that are related to a non-functional FRU, such as activating, strobing, or changing a color of a status or other visual indicator (e.g., a light-emitting diode (LED), an icon, an alpha-numeric displays, a light, etc.). In an example, library 115 may identify actions that affect a status LED of a non-functional FRU, a status LED of a group of status indicators of a drawer that includes the non-functional FRU, a status LED of a group of status indicators of a rack of system 102 that includes the non-functional FRU, and a combination thereof. In another embodiment, library 115 updates in response to changes in NVRAM 105 and/or library 145.

System management programs 118 is a suite of programs utilized to monitor and control aspects of system 102. System management programs 118 and can interface management program 148 with a user of computer 140. One or more programs of system management programs 118 are licensed internal code (LIC) programs. In some embodiments, system monitoring programs 118 may include one or more protocols, such as simple network management protocol (SNMP) enabling communication and coordination among instances of SE 112. In various embodiments, system management programs 118 enables SE 112 to activate, idle, power off, power on, and reconfigure one or more portions of system 102, such as individual FRUs, drawers, and/or racks of system 102. System management programs 118 also includes the ability to affect other physical hardware of system 102 and provide information to a hypervisor of system 102 as to the states and quantities of physical computing resources that are available to system 102. In an embodiment, system management programs 118 facilitates communications of SE 112, system analysis program 200, and/or device checking program 300 via various instances of bus 110 to instances of FRU 120A through FRU 120N operatively coupled to an instance of bus 110.

FRU 120A through FRU 120N are representative of one or more field-replaceable units within system 102. Instances of FRU 120 may represent different FRU-types. For example, instances of FRU 120A may represent dual in-line memory modules (DIMMs), instances of FRU 120B may represent power/thermal FRUs, instances of FRU 120C may represent I/O controllers, instances of FRU 120N may represent DASD units, etc. In various embodiments, each instance of FRU 120A through 120N includes a SEEPROM that further includes non-volatile storage (e.g., flash memory) configured as two or more memory pages.

In one embodiment, system 102, SE 112, and computer 140 communicate through network 130. Network 130 can be, for example, a local area network (LAN), a telecommunications network, a wireless local area network (WLAN), a wide area network (WAN), such as the Internet, or any combination of the previous, and can include wired, wireless, or fiber optic connections. In another embodiment, system 102 includes an internal version of network 130 (not shown) that enables communication between SE 112 and external network 130 and computer 140. In general, network 130 can be any combination of connections and protocols that will support communications between system 102, SE 112, and computer 140, in accordance with embodiments of the present invention. In some embodiments, network 130 operates locally via wired, wireless, or optical connections and can be any combination of connections and protocols (e.g., near field communication (NFC), laser, infrared, etc.).

System analysis program 200 determines whether a computing system includes non-functional FRUs, determines one or more responses related to the non-functional FRUs, and initiates the determined one or more actions associated with a determined response. In various embodiments, system analysis program 200 interfaces with personnel associated with system 102, such as technicians, administrators, service engineers, etc., via SE 112 and/or computer 140. In an embodiment, system analysis program 200 utilizes device checking program 300 to identify whether system 102 includes one or more non-functional FRUs. In one embodiment, system analysis program 200 is implemented within firmware 106 of system 102 and can identify FRUs of system 102 based on information stored within NVRAM 105. In one scenario, system analysis program 200 executes in response to a power-up of system 102. In another scenario, system analysis program 200 executes as a portion of the boot sequence of system 102. In another embodiment, system analysis program 200 is included as a program within SE 112.

In some embodiments, system analysis program 200 executes in response to inactivating a portion of system 102. In an example, system analysis program 200 executes as part of a protocol to idle a portion (e.g., a drawer) of system 102 reduce energy consumption in response to a reduction in demands of users. In other embodiments, system analysis program 200 can operate in parallel to inspect FRUs while the computing system is operating. In an example, in response to detecting a read operation accessing VPD distributed among pages of a multi-page image from the SEEPROM of a FRU, system analysis program 200 applies one or for checks to determine a status for at least FRU that includes the accessed SEEPROM.

Device checking program 300 inspects one or more portions of system 102 to determine a status for one or more FRUs of system 102 that include a multi-page, non-volatile memory device; and returns the status for each of the one or more FRUs to system analysis program 200. Device checking program 300 may determine which FRUs or group of FRUs to inspect based on information received from system analysis program 200. Device checking program 300 may obtain some information associate with FRUs of system 102 from NVRAM 105 and/or library 115. In various embodiments, device checking program 300 interfaces and communicates with one or more FRUs based on a bus (e.g., an internal communication fabric) that operatively couple the one or more FRU.

In one embodiment, device checking program 300 identifies a failed FRU based on a lack of response and/or an error associated with a read request (e.g., operation) to access data from a multi-page non-volatile memory device of a FRU. In another embodiment, device checking program 300 identifies a failed FRU based on comparing data from two consecutive pages of a multi-page non-volatile memory device of a FRU and determining that the data does not differ. In some embodiments, device checking program 300 determines that all FRUs of a group of FRUs have failed (e.g., are bad) based on a lack of a response associated with one or more commands broadcast along a bus to activate a memory function of each multi-page non-volatile memory device of a respective FRU of the group of FRUs In one embodiment, computer 140 is representative of a console and computer utilized to administrate (e.g., monitor and control) various aspects of system 102. In another embodiment, computer 140 is representative of a group of consoles and computers that administrate a plurality of instances of system 102 within a data center (not shown). In various embodiments, computer 140 utilizes network 130 to communicate with an organization (not shown) that services system 102, such as a field service representative and/or a supplier of system 102. In an embodiment, computer 140 includes library 145 and management programs 148. Library 145 include information associated with a plurality of FRUs within system 102. Computer 140 may also include additional programs that augment management programs 148, such as a dynamic automation program and a machine learning program to identify new/changed responses, actions, and interactions within system 102 in response to failing FRUs.

In one embodiment, library 145 includes a copy of the information within NVRAM 105 and/or one or more instances of library 115, such as FRU IDs, corresponding FRU-types, locations if each FRU within system 102, etc. Library 145 may also include additional information associated with a FRU, such as a manufacturer, calibration settings, age (e.g., power-on duration), etc. In various embodiments, library 145 includes one or more actions related to a response associated with determining that one or more FRUs are flagged with a status of non-functional. Library 145 may include decision trees, hierarchy of actions/responses, etc. Library 145 may be updated with new or modified sets of actions and associated responses. Updates to library 145 may be propagated to one or more instances of library 115. In addition, library 145 may include computing resource configurations and operational thresholds/values related to the number of functional or non-functional FRUs within a portion of system 102 and related actions. In one example, library 145 includes a set of actions and thresholds that determines whether a drawer within a rack of system 102 is deactivated or operates at a reduced level of computing resources.

Management programs 148 includes programs and generates various operational interfaces that enable a technician and/or an administrator to determine a status for various aspects of system 102 and modify/control/administer the operations of system 102. In an embodiment, management programs 148 interfaces with management programs 118 and/or an instance of system analysis program 200 to obtain information and dictate one or more actions to system 102. In some embodiments, management programs 148 automatically initiate one or more sets of actions associated with identifying one or more non-functional FRUs within system 102 based on information stored within library 145. In other embodiments, management programs 148 interface with a technician and/or an administrator of system 102 to determine which set of actions, associated with identifying one or more non-functional FRUs within system 102 based on information stored within library 145, to initiate. In another embodiment, management programs 148 automatically contact a service organization associated with maintaining system 102 to identify problems associated with system 102. In a further embodiment, management programs 148 communicate with a virtual engineer within another computing system (not shown) via network 130 to obtain a set of actions for system 102.

Figure 2:
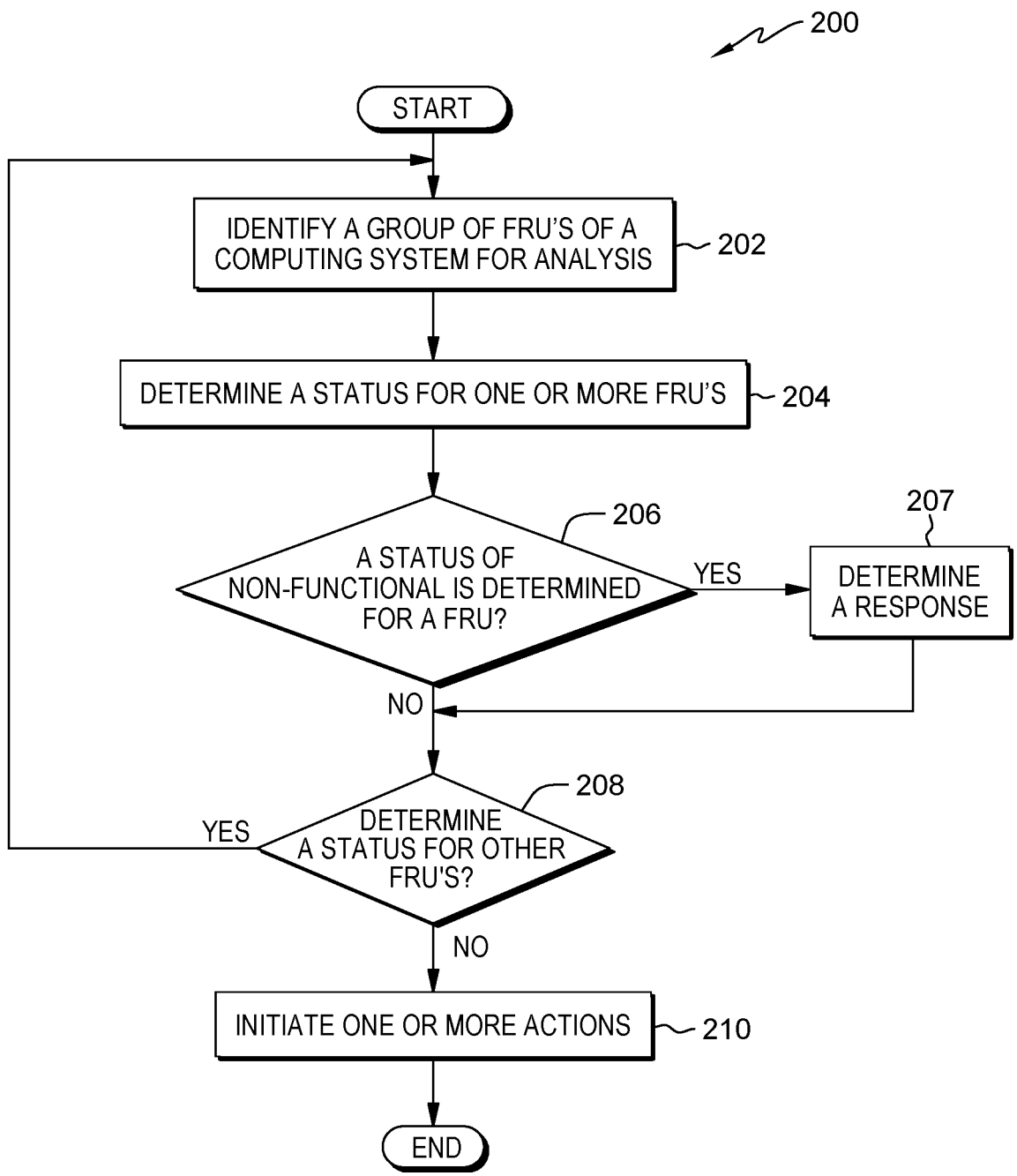
FIG. 2 depicts a flowchart of steps of a system analysis program, in accordance with an embodiment of the present invention.

FIG. 2 is a flowchart depicting operational steps for system analysis program 200, a program for identifying whether a computing system includes one or more non-functional devices (i.e., FRUs), determining one or more responses based on the type and location of the identified non-functional FRUs, and initiating one or more actions based on the determined responses, in accordance with embodiments of the present invention. In one embodiment, system analysis program 200 utilizes device checking program 300 to determine a status of functional or non-functional for a plurality of FRUs of the computing system. In some embodiments, multiple instances of system analysis program 200 execute concurrently or independently within system 102, such as an instance executing to analyze a rack.

In step 202, system analysis program 200 identifies a group of FRUs of a computing system for analysis. System analysis program 200 identifies a group of FRUs based on accessing information stored within one or more locations, such as libraries or within a storage device available during a boot sequence associated with system 102. The identified FRUs can include a multi-page non-volatile memory (e.g., storage) device, such as a SEEPROM. In one embodiment, system analysis program 200 identifies a first group of FRUs of system 102 for analysis. Subsequently, system analysis program 200 identifies another group of FRUs of system 102 for analysis based on looping via the "Yes" branch of decision step 208.

In various embodiments, system analysis program 200 further identifies and/or defines a group of FRUs based on various criteria, such a FRU-type, status of various portions (e.g., racks, drawers, etc.) of system 102 that are analyzed, an operational hierarchy, and/or a change in operations related to system 102, such as power-up, idling, reconfiguring, etc. In some embodiments, system analysis program 200 identifies a group of FRUs of system 102 for analysis based on information stored in NVRAM 105. In other embodiments, system analysis program 200 identifies a group of FRUs of system 102 for analysis based on information stored in library 115 of SE 112. In another embodiment, system analysis program 200 identifies a group of FRUs of system 102 for analysis based on information received from management program 148 of computer 140. In an embodiment, system analysis program 200 identifies individual FRUs of system 102 for analysis.

In step 204, system analysis program 200 determines a status for one or more FRUs. In one embodiment, system analysis program 200 determines a status for one or more FRUs by executing one or more instances of device checking program 300 and identifying to device checking program 300 the one or more (e.g., a group of) FRUs to check. In some embodiments, system analysis program 200 determines a status for various groups of FRUs based on a hierarchy, a set of rules, and/or a predefined sequence. In one example, system analysis program 200 may first determine a status for power FRUs first prior to other FRUs, such as memory FRUs, because until the power FRUs are active, power is not available for the bus that is utilized by the memory FRUs. In another example, system analysis program 200 determines a status for one or more FRUs of a group of FRUs based on FRU-type and/or utilized (i.e., shared) bus, such as FRUs connected to an $I^2C$ bus.

In some scenarios, system analysis program 200 may determine that a bus is utilized by multiple portions of system 102 and constrains the communications associated with the bus to a limited area within system 102, such as a rack or a drawer. In other embodiments, system analysis program 200 determines a status for one or more FRUs based on a power-up/boot sequence related to each portion of system 102. In an example, system analysis program 200 determines a status of each FRU within a drawer as each drawer within a rack activates. In another embodiment, system analysis program 200 receives a status determination of functional or non-functional from device checking program 300 for each member of the identified group of FRUs. In various embodiments, system analysis program 200 can receive a status determination for a FRU as the status is determined as opposed to waiting for a status determination for each member of the identified group of FRUs.

In decision step 206, system analysis program 200 determines whether a status of non-functional is determined for a FRU. In one embodiment, system analysis program 200 receives a status determination of non-functional from device checking program 300 for one or more FRUs of an identified group of FRUs. In another embodiment, system analysis program 200 receives a status determination of functional or non-functional from device checking program 300 for each FRU of an identified group of FRUs. In some embodiment, system analysis program 200 compiles set of status determination of non-functional from various groups of FRUs within a portion of system 102, such as compiling a set of statuses for the FRU of a drawer of a rack within system 102.

In decision step 206, responsive to determining that a status of non-functional is determined for a FRU (Yes branch, decision step 206), system analysis program 200 determines a response (step 207).

In step 207, system analysis program 200 determines a response. A response may include an action, such as identifying a priority, determining a sequence of events, communicating a message, processing a decision tree, or a combination thereof. In one embodiment, system analysis program 200 determines a response related to one or more non-functional FRU based on information within library 115 of SE 112. In another embodiment, system analysis program 200 determines a response related to one or more non-functional FRU based on communicating with management program 148 and accessing information within library 145 of computer 140. In some embodiments, system analysis program 200 determines a response to a determination of non-functional for one or more FRUs of a group of checked FRU based on additional information associated with each non-functional FRU, such as a FRU-type, a number of non-functional FRUs, and/or a location associated with each non-functional FRU.

In one example, if system analysis program 200 determines that a drawer (not shown) of system 102 includes less than a threshold number of functional FRUs, then system analysis program 200 determines a response of "do not use" for the drawer. In another example, if system analysis program 200 determines that the number of non-functional FRUs within a location (e.g., along a bus, within a drawer, in a rack) is between two values, then system analysis program 200 may determine that the response to is to utilize the location within system 102 at a reduced capability, such as limiting the computing resource for provisioning virtual machines, or constraining the network bandwidth (e.g., speed, capacity) assigned to a reduced number of communication ports.

Still referring to step 207, in various embodiments, system analysis program 200 determines one or more further responses to the determined responses, such as identifying one or more predefined actions and/or actions within library 115 and/or 145 that were initiated in response to similar FRU failures. In one example, system analysis program 200 determines that the FRU failure is related to a minor malfunction within system 102. In response system analysis program 200 determines the responses of: not activating the affected portion of system 102, notifying an administrator or on-site service representative to replace one or more non-functional FRU, and activating an inactive portion of system 102. In another example, if system analysis program 200 determines that the FRU failure is related to a major malfunction affecting system 102, then system analysis program 200 determines a response of initiating a field-service call and notifying the administrator of system 102 via computer 140.

In other embodiments, if system analysis program 200 cannot determine a response related to one or more non-functional FRU, then system analysis program 200 communicates with an administrator of system 102 via management program 148 of computer 140 to obtain a response related to one or more FRUs determined as non-functional. Based on the response obtained via management program 148, system analysis program 200 may update library 115 and/or library 145 with the newly determined response. In another embodiment, system analysis program 200 may communicate with another computing system (not shown) over network 130 to obtain a response related to the one or more non-functional FRUs. In an example, system analysis program 200 may communicate with a virtual engineer or dynamic automation program (not shown) within another computing center (not shown) that hosts a computing system, similar to system 102 to obtain one or more responses related to the one or more FRUs associated with a status of non-functional. In an embodiment, system analysis program 200 subsequently determines whether to determine a status for other FRUs (decision step 208).

Referring to decision step 206, responsive to determining a status of non-functional is not determined for a FRU (No branch, decision step 206), system analysis program 200 determines whether to determine a status for other FRUs (decision step 208).

In decision step 208, system analysis program 200 determines whether to determine a status for other FRUs. System analysis program 200 may access a table, a list, an associative array, a decision tree, and/or an operational hierarchy to determine whether to determine a status for other FRUs. In one embodiment, system analysis program 200 determines to determine a status for other FRUs based on determining that each FRU, FRU-type, and/or FRU location identified within a table, list, or other information source within NVRAM 105, library 115, and/or library 145 was not tested (e.g., checked) by an instance of device checking program 300. In another embodiment, system analysis program 200 determines to determine a status for other FRUs based on one or more events associated with system 102, such as powering on another portion of system 102 or idling a portion of 102. In some embodiments, in response determining to determine a status for other FRUs, system analysis program 200 initiate another instance of system analysis program 200 to process the "Yes" branch of decision step 208 while the current instance of system analysis program 200 initiates one or more actions (step 210) based on a determined response (in step 207). In other embodiments, system analysis program 200 determines not to determine a status for other FRUs based on a determined response. In an example, system analysis program 200 determines not to determine a status of other FRUs of a drawer if the power FRUs are determined to be non-functional.

Responsive to determining to determine a status for other FRUs (Yes branch, decision step 208), system analysis program 200 loops to step 202 to identify another group of FRUs within computing system 102.

In step 210, system analysis program 200 initiates one or more actions. In various embodiments, system analysis program 200 utilizes system management programs 118 and/or management program 148 of computer 140 to initiate the one or more actions. Actions to initiate may be further defined within library 115 of SE 112 and/or library 148 of computer 140. In one embodiment, system analysis program 200 initiates one or more actions based on the one or more responses determined in step 207. In another embodiment, system analysis program 200 utilizes respective instances of SE 112 and system management programs 118 to initiate one or more actions within system 102. In one example, system analysis program 200 utilizes SE 112 and system management programs 118 to deactivate a portion of system 102, update information within NVRAM 105, and communicate with a load-balancer (not shown) to identify the available resources of system 102 based on one or more responses related to non-functional FRU. In another example, in addition to affecting the booting or configuration of system 102, system analysis program 200 may dictated to instance of SE 112 to activate various LEDs and indicators identifying the portions of system 102 affected by non-functional FRUs. In addition, system analysis program 200 may communicate with management program 148 of computer 140 to graphically map (e.g., generate a visual indication) the locations of FRUs with a status of non-functional within system 102 and identify alternative configurations for portions of system 102.

In some embodiments, system analysis program 200 initiates one or more actions in response identifying multiple responses related to multiple determinations of non-functional FRUs based on identifying a hierarchy, priority, and/or a decision tree associated with the responses. In one example, if system analysis program 200 determining that multiple drawers within a rack include various (e.g., numbers, types) non-functional FRUs, analysis program 200 may determine that it is safer to disable an entire affected rack as opposed to disabling and reconfiguring drawers within the affected rack. In another example, system analysis program 200 may determine to initiate a backup of storage devices within an affected rack prior to idling the rack and powering off drawers that require replacement of non-functional CRUs by a technician or engineer of system 102.

Still referring to step 210, in other embodiments, system analysis program 200 initiates one or more actions in response identifying FRUs associated with a functional status. If system analysis program 200 identifies a lack of non-functional FRUs, then system analysis program 200 allows system 102 to boot without constraint and indicates a lack of problems to management program 148 of computer 140. In an example, in response to system analysis program 200 not identifying a non-functional FRU, system analysis program 200 indicates to instances of system management program 118 to activate the functional-status indicator lights on the FRUs, boot system 102 without constraints, and communicate a message to management programs 148 to relaying the status of system 102.

Figure 3:
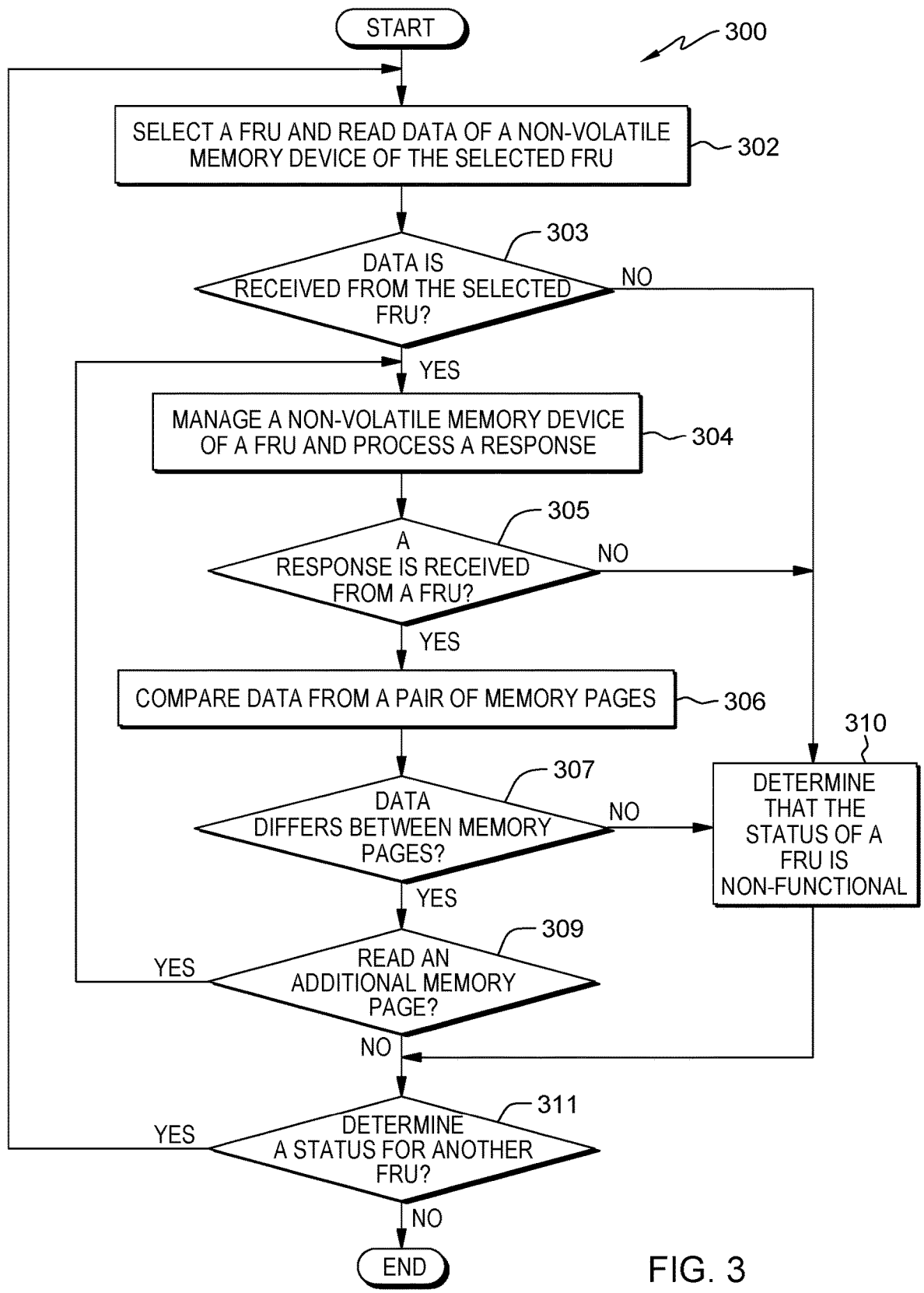
FIG. 3 depicts a flowchart of steps of a device checking program, in accordance with an embodiment of the present invention.

FIG. 3 is a flowchart depicting operational steps for device checking program 300, a program for determine a status (e.g., condition) corresponding to a FRU that includes a multi-page, non-volatile memory device based on one or more responses of the FRU to one or more commands, in accordance with embodiments of the present invention. In one embodiment, device checking program 300 initiates based on system analysis program 200 requesting a status determination for an identified group of FRUs (step 204) and returns an indication of a status corresponding to each FRU of the identified group of FRUs. In another embodiment, device checking program 300 is a subroutine of system analysis program 200. In some embodiments, multiple instances of device checking program 300 can execute concurrently to check different groups of FRUs, such as different FRU-types, FRUs connected to different busses, and/or FRU located within different portions for system 102. In various embodiments, device checking program 300 can communicate a status determination for a FRU to system analysis program 200 as the status of the FRU is determined as opposed to waiting until a status is determined for each FRU of a group of identified FRUs.

In step 302, device checking program 300 selects a FRU and reads data of a non-volatile memory device of the selected FRU. In an embodiment, device checking program 300 selects a FRU that is a member of a group of identified FRUs. Device checking program 300 transmits one or more commands via an instance of bus 110 to initiate one or more actions by a non-volatile memory device of the selected FRU. Device checking program 300 may select a FRU from a group of identified FRUs based on a random selection, a sequential selection, or hierarchical dictates. In one scenario, device checking program 300 selects a FRU to read based on information within NVRAM 105. In another scenario, device checking program 300 selects a FRU to read based on information within library 115 of SE 112, such as a location corresponding to a FRU. In some scenarios, device checking program 300 selects a FRU to read based on a dictate received from system management program 118 of SE 112. In other scenarios, device checking program 300 selects a FRU to read based on a dictate received from management program 148 of computer 140.

In another embodiment, in response to selecting a FRU, device checking program 300 transmits a read request (e.g., one or more commands) that include an ID of the selected FRU via an instance of bus 110 to initiate one or more actions related to reading data from a non-volatile memory device of the selected FRU. Device checking program 300 can read data from the non-volatile memory device of the selected (e.g., specified) FRU based on: a last accessed memory location, a specified memory location (e.g., random access), or a sequential memory location of a current memory page. In some embodiments, device checking program 300 indicates to read one byte from a non-volatile memory device (e.g., a SEEPROM) of the selected FRU. In various embodiments, device checking program 300 determines that reading the non-volatile memory device of the selected FRU fails based on receiving an error code from the non-volatile memory device of the selected FRU or determining that the read request did not generate any responses.

In decision step 303, device checking program 300 determines whether data is received from the selected FRU. In one embodiment, device checking program 300 determines that data is received from the non-volatile memory device of the selected FRU based on receiving one byte of data from a SEEPROM of the selected FRU. In another embodiment, device checking program 300 determines that data is received from the non-volatile memory device of the selected FRU based on receiving an ACK (i.e., acknowledge) response from the SEEPROM corresponding to the selected FRU.

In decision step 303, responsive to determining that data received from the selected FRU (Yes branch, decision step 303), device checking program 300 manages a non-volatile memory device of a FRU and processes a response (step 304).

In step 304, device checking program 300 manages a non-volatile memory device of a FRU and processes a response. In one embodiment, device checking program 300 manages a non-volatile memory device of a FRU by specifying a memory page of non-volatile memory device to access (e.g., read). In one scenario, device checking program 300 specifies a first memory page of multiple memory pages of the respective non-volatile memory devices of a group of identified FRUs, identifies the memory management commands related to the non-volatile memory devices, and identifies a related instance of bus 110 (e.g., a location within system 102) that operatively couples the group of identified FRUs. Device checking program 300 broadcasts one or more commands, via the related instance of bus 110, to set the one or more non-volatile memory devices to respective first memory pages. In an example, device checking program 300 broadcasts a "set page address" (SPA) command along an I$^2$C bus utilized (i.e., shared) by an array of DIMMs (not shown) to set the memory page to access to a first memory page for the respective SEEPROM of each DIMM of the array. In some scenarios, device checking program 300 broadcasts another one or more commands, such as "read page address" (RPA) to the group of identified FRUs that utilize the I$^2$C bus to verify whether the SPA command successfully set one or more SEEPROMs of the group of identified FRUs to the specified memory page (e.g., checking whether page-shifting was successful).

In another embodiment, in response to looping via the "Yes" branch of decision step 309 to read an additional memory page, device checking program 300 manages the non-volatile memory device of a FRU by specifying a next memory address (e.g., a subsequent memory page) related to the respective non-volatile memory devices of the group of identified FRUs. In an example, device checking program 300 determines that a group of instances of FRU 120C include respective instances NV memory device 121C (e.g., SEEPROMs), which include three memory pages. An instance of device checking program 300 may loop twice via the "Yes" branch of decision step 309 to set, verify, and/or read each of the three memory pages associated with instances of FRU 120C and respective instance of NV memory device 121C.

Still referring to step 304, in some embodiments, device checking program 300 processes a response related managing the respective non-volatile memory devices of the group of identified FRUs. Device checking program 300 processes responses by: identifying one or more responses, identifying a lack of responses, and/or identifying an error code. In an example, because device checking program 300 broadcasts an SPA command associated with setting a memory address via an instance of bus 110, each FRU of the group identified FRUs that are operatively coupled to the instance of bus 110 receives the SPA command and can return a response to the SPA command with an ACK response or a NACK (i.e., no-acknowledge) response via a shared line of the instance of bus 110. Similarly, in response to device checking program 300 broadcasting an RPA command via an instance of bus 110, each FRU of the identified group of FRUs operatively coupled to the bus receives the RPA command and can return an ACK response or a NACK response via the shared line of the instance of bus 110. Because of the structure of a broadcast command, device checking program 300 receives an ACK or NACK response for processing from the group of FRU operatively coupled to an instance of bus 110 without identifying which FRU sent the response. In some scenarios, receiving an ACK response may preclude device checking program 300 from identifying a NACK response.

In other embodiments, device checking program 300 further manages a non-volatile memory device of a FRU by transmitting a read request via the instance of bus 110 for processing by the previously selected FRU based on the current (e.g., set) memory page of the non-volatile memory device. However, if the SPA command failed for the selected FRU, then the memory page that is read is a memory page different from the set memory page (e.g., a page-shifting failure). In one scenario, device checking program 300 receives data from the selected FRU in response to the read request. Therefore, device checking program 300 determines that the selected FRU is potentially functional. In some scenarios, device checking program 300 processes the response of the selected FRU by caching the data received from the non-volatile memory device within storage 104 and/or storage 114 of SE 112. The data from the memory page is be cached in RAM and/or in non-volatile memory for comparison in step 306.

In decision step 305, device checking program 300 determines whether a response is received from a FRU. In one embodiment, device checking program 300 determines that a response is not received if neither ACK response nor a NACK response is received from any of the non-volatile memory devices of identified FRUs for both the SPA and RPA commands (e.g., setting and verifying a page address). In some embodiments, if device checking program 300 receives either one ACK response or a NACK response from a non-volatile memory device of any FRU of the group of identified FRU, then device checking program 300 determines that a response is received from a FRU. In response to receiving either an ACK response or a NACK response, device checking program 300 determines that at least one FRU, of the identified group of FRUs, is potentially functional. However, checking program 300 cannot determine a status related to individual FRUs because of the structure of broadcasting commands via bus 110.

In other embodiments, device checking program 300 determines that a response is received from a FRU based on receiving data from a non-volatile memory device of the selected FRU in response to the read request. In various embodiments, device checking program 300 determines response is received from a FRU based on receiving a combination of responses. In an example, device checking program 300 can receive an ACK or NACK in response to an RPA command indicating that at least one FRU of the group of identified FRUs is potentially functional in addition to receiving data from the non-volatile memory device of the selected FRU. In some instances, the selected FRU is the source of both the received data and an ACK response or a NACK response.

In decision step, 305, in one embodiment, responsive to determining that device checking program 300 receives at least one ACK response or one NACK response associated with specifying (e.g., setting) a first memory page and caching data received from a memory page of the non-volatile memory device of the selected FRU (Yes branch decision step 305), device checking program 300 skips step 306 and decision step 307, and loops via the "Yes" branch of decision step 309 to initiate a page-swap to the next (e.g., second) memory page by managing a non-volatile memory device of a FRU (step 304). In another embodiment, responsive to determining that device checking program 300 receives at least one ACK response or one NACK response associated with a next memory page (e.g., a second, a third, etc.) and caches data received from a memory page of the non-volatile memory device of the selected FRU (Yes branch decision step 305), device checking program 300 compares data from a pair of memory pages (step 306).

In some embodiments, responsive to determining that at least one response is received with respect to setting and/or verifying a memory page of the respective non-volatile memory devices of the identified group of FRU but a read quest fails for the specified FRU at step 302, then device checking program 300 skips step 306, decision step 307, and proceeds via the "No" branch of decision step 309 to determine whether to determine a status for another FRU (decision step 311). In other embodiments, responsive to determining that at least one response is received with respect to setting and/or verifying a memory page of the respective non-volatile memory devices of the identified group of FRU but a read quest fails for the specified FRU at step 304, then device checking program 300 skips step 306, decision step 307, and proceeds via the "No" branch of decision step 309 to determine whether to determine a status for another FRU (decision step 311).

In step 306, device checking program 300 compares data from a pair of memory pages. Device checking program 300 compares cached data from the current memory page with the cached data from the previous memory page. In an embodiment, device checking program 300 compares memory pages based on an absolute (e.g., 100%, byte to byte) match. In some embodiments, if device checking program 300 determines that data from a pair of memory pages from the non-volatile memory device of the selected FRU is cached (e.g., the current memory page and the prior memory page, sequential memory pages), then device checking program 300 compares data from the pair of memory pages. In one scenario, if device checking program 300 determines that the non-volatile memory device of the selected FRU includes only two memory pages, then device checking program 300 compares the cached memory pages corresponding to the selected FRU.

In another scenario, if device checking program 300 determines that the non-volatile memory device of the selected FRU includes three or more memory pages and that the current memory page is the last memory page of the non-volatile memory device, then device checking program 300 compares the current memory page and the prior memory page. In various embodiments, if device checking program 300 determines that the current memory page is the last memory page of a non-volatile memory device of the selected FRU and that the data differs between memory pages, then device checking program 300 determines that the status of the selected FRU is functional. In other embodiments, device checking program 300 determines that the data does not differ (e.g., remains the same, is unchanged) between the current memory page and the prior memory page indicating a page-shifting error occurred with respect to the non-volatile memory device of the selected FRU.

In decision step 307, responsive to determining that the data differs between memory pages (Yes branch, decision step 307), device checking program 300 determines whether to read an additional memory page (decision step 309).

In decision step 309, device checking program 300 determines whether to read an additional memory page. In one embodiment, in response to receiving data from a first memory page of the selected FRU (in step 304), device checking program 300 determines to read an additional (e.g., second) memory page from the non-volatile memory device of the selected FRU. In some embodiment, in response to device checking program 300 determining that the non-volatile memory device of the selected FRU includes three or more pages of memory and that that current memory page is not the last memory page, device checking program 300 determines to read an additional (e.g., next) memory page from the non-volatile memory device of the selected FRU. In another embodiment, if device checking program 300 determines that the current memory page is the last memory page of the non-volatile memory device of the selected FRU, then device checking program 300 does not read an additional memory page.

In decision step 309, responsive to determining to read an additional memory page (Yes branch, decision step 309), device checking program 300 loops to step 304 to read the additional memory page by managing a non-volatile memory device of a FRU.

Referring to decision step 303, responsive to determining that data is not read from the selected FRU (No branch, decision step 303), device checking program 300 determines that a status of a FRU is non-functional (step 310).

In step 310, device checking program 300 determines that a status of a FRU is non-functional. In one embodiment, in response to device checking program 300 determining that data is not read from the selected FRU (No branch, decision step 303), device checking program 300 determines that a status of the selected FRU is non-functional.

Referring to decision step 305, responsive to determining that a response is not received from a FRU (No branch, decision step 305), device checking program 300 determines that a status of a FRU is non-functional (step 310).

Referring to step 310, in another embodiment, in response to device checking program 300 determining that a response is not received (e.g., a lack of an ACK/NACK response) from any FRUs of the identified group of FRUs (step 304), device checking program 300 determines a status of non-functional for each FRU of the identified group of FRUs. In some embodiments, in response to device checking program 300 determining that at least one response is received but data is not received from the selected FRU based on setting a memory page, device checking program 300 determines that a status of the selected FRU is non-functional. In addition, checking program 300 may determine that a status of the selected FRU is non-functional based on receiving an error code.

Referring to decision step 307, responsive to determining that the data does not differs between memory pages (No branch, decision step 307), device checking program 300 determines that the status of a FRU is non-functional (step 310).

Referring to step 310, in other embodiments, if device checking program 300 determining that the data does not differ between cached memory pages of a selected FRU, then device checking program 300 determines a status of the selected FRU is non-functional. In various embodiments, in response to determining a status of non-functional for the FRU, device checking program 300 purges the cache of stored memory pages of the memory pages corresponding to a non-functional FRU.

Referring to decision step 309, responsive to determining not to read an additional memory page (No branch, decision step 309), device checking program 300 determines whether to determine a status of for another FRU (decision step 311).

In decision step 311, device checking program 300 determines whether to determine a status for another FRU. In various embodiments, device checking program 300 determines to determine a status of another FRU based on determining that at least one FRU of the identified group of FRUs lacks a status determination of either functional or non-functional. In one embodiment, device checking program 300 determines not to determine a status of another FRU in response to determining in step 310 a status of non-functional (e.g., "bad") for each FRU of the identified group of FRU. In another embodiment, device checking program 300 determines not to determine a status of another FRU based on determining that each FRU of the identified group of FRUs has a status determination of either functional or non-functional.

Responsive to determining to determine a status for another FRU (Yes branch, decision step 311), device checking program 300 loops to step 302 to select another FRU of the identified group of FRUs. Responsive to determining not to determine a status for another FRU (No branch, decision step 311), the current instance of device checking program 300 communicates the determined statuses of each FRU of the identified group of FRUs to system analysis program 200 and then terminates.

Figure 4:
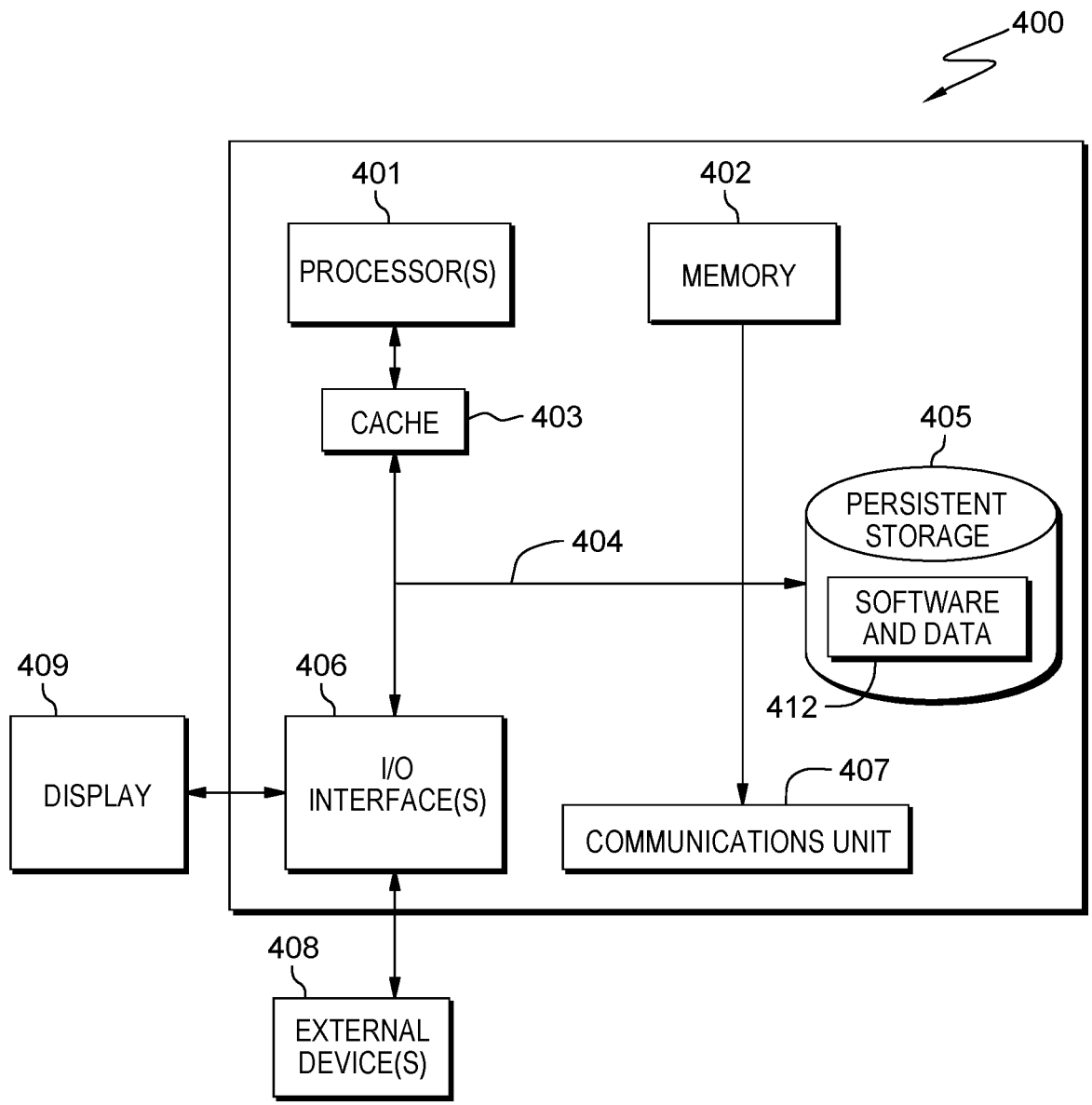
FIG. 4 is a block diagram of components of a computer, in accordance with an embodiment of the present invention.

FIG. 4 depicts computer system 400, which is representative of system 102, instance of service element (SE) 115, and computer 140. In some embodiment, one or more FRUs of FRU 120A through 120N include one or more elements depicted within computer system 400. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In some embodiments, with respect to FRU 120A through 120N, persistent storage 405 includes a corresponding multi-page SEEPROM.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 102, software and data 412 includes firmware 106, system analysis program 200, device checking program 300, and other programs and data (not shown). With respect to FRU 120A through FRU 120N, software and data 412 includes vital product data and various programs (not shown) to operate a respective FRU. With respect to computer 140, software and data 412 includes library 145, management program 148, and other data and programs (not shown).

Communications unit 407, in these examples, provides for communications with other data processing systems or devices, including resources of system 102, SE 115, and computer 140. In an embodiment, one or more instances communications unit 407 is utilized within bus 110 to provide communications with system 102, SE 115, and FRU 120A through FRU 120N. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing hardware within a computing system, the method comprising:
    identifying, by one or more computer processors, a plurality of field-replaceable units (FRUs) within a computing system that respectively include a non-volatile memory device;
    determining, by one or more computer processors, a status corresponding to a FRU of the identified plurality of FRUs;
    in response to determining a non-functional status of the FRU of the identified plurality of FRUs, determining, by one or more computer processors, a response related to the non-functional FRU; and
    initiating, by one or more computer processors, an action on the computing system based on the determined response related to the non-functional FRU, wherein the initiated action is reconfiguring a portion of the computing system that includes the non-functional FRU to operate at a reduced capability.

2. The method of claim 1, wherein the non-volatile memory device of an identified FRU is a multi-page non-volatile memory device that stores at least vital product data (VPD) related to a FRU.

3. The method of claim 1, wherein determining the status corresponding to the FRU further comprises:
    initiating, by one or more computer processors, a read operation to obtain data stored within a respective non-volatile memory device of the FRU utilizing a hardware bus that facilitates communication between the plurality of FRUs and a management program of the computing system; and
    in response to not obtaining data from the FRU in response to the read operation, determining, by one or more computer processors, that a status corresponding to the FRU is non-functional.

4. The method of claim 1, further comprises:
    broadcasting, by one or more computer processors, via a hardware bus that operatively couples the plurality of FRUs, one or more commands to change and to access a memory page of the respective non-volatile memory devices of the plurality of FRUs;
    in response to failing to receive a response to the one or more commands to change and to access the memory page of respective non-volatile memory devices of the plurality of FRUs, determining, by one or more computer processors, that the status corresponding to the FRUs of the plurality of FRUs is non-functional.

5. The method of claim 4, further comprising:
in response to receiving at least one response to the one or more commands to change and to access another memory page from among the respective non-volatile memory devices of the plurality of FRUs, initiating, by one or more computer processors, a comparison of data stored within sequential memory pages of the FRU; and
in response to determining that the comparison of data stored within sequential memory pages of the FRU indicates that the data remains the same between sequential memory pages of non-volatile memory device of the FRU, determining, by one or more computer processors, that the status corresponding to the FRU is non-functional.

6. The method of claim 1, further comprising:
in response to determining the status of two or more FRUs of the plurality of FRUs are non-functional, identifying, by one or more computer processors, locations within the computing system corresponding the two or more non-functional FRUs;
determining, by one or more computer processors, a response related to the two or more non-functional FRUs, based on criteria associated the locations corresponding to the two or more non-functional FRUs and a threshold number of non-functional FRUs within the portion of the computing system;
wherein the other response related to the two or more non-functional FRUs is selected from the group consisting of: determining to disable the portion of the computing system that includes the threshold number of non-functional FRUs, determining another configuration for the portion of the computing system that includes the threshold number of non-functional FRUs, and communicating with a management program of the computing system; and
initiating, by one or more computer processors, one or more actions corresponding to the response related to the two or more non-functional FRUs.

7. The method of claim 1, wherein the initiated action on the computer system is selected from the group consisting of: disabling the portion of the computing system, generating one or more visual indications associated with the corresponding location of the non-functional FRU, and transmitting a notification to an administrator of the computing system.

8. A computer program product for managing hardware within a computing system, the computer program product comprising:
one or more computer readable storage media and program instructions stored on the one or more computer readable storage media, the program instructions readable/executable by one or more computer processors:
program instructions to identify a plurality of field-replaceable units (FRUs) within a computing system that respectively include a non-volatile memory device;
program instructions to determine a status corresponding to a FRU of the identified plurality of FRUs;
in response to determining a non-functional status of the FRU of the identified plurality of FRUs, program instructions to determine a response related to the non-functional FRU; and
program instructions to initiate an action on the computing system based on the determined response related to the non-functional FRU, wherein the initiated action is reconfiguring a portion of the computing system that includes the non-functional FRU to operate at a reduced capability.

9. The computer program product of claim 8, wherein the non-volatile memory device of an identified FRU is a multi-page non-volatile memory device that stores at least vital product data (VPD) related to a FRU.

10. The computer program product of claim 8, wherein the program instructions to determine the status corresponding to the FRU further comprise:
program instructions to initiate a read operation to obtain data stored within a respective non-volatile memory device of the FRU utilizing a hardware bus that facilitates communication between the plurality of FRUs and a management program of the computing system; and
in response to not obtaining data from the FRU in response to the read operation, program instructions to determine that a status corresponding to the FRU is non-functional.

11. The computer program product of claim 8, further comprises:
program instructions to broadcast, via a hardware bus that operatively couples the plurality of FRUs, one or more commands to change and to access a memory page of the respective non-volatile memory devices of the plurality of FRUs;
program instructions to determine whether one or more responses are received from the respective non-volatile memory devices of the identified group of FRU in response to broadcasting the second one or more commands and the third one or more commands; and
in response to failing to receive a response to the one or more commands to change and to access the memory page of respective non-volatile memory devices of the plurality of FRUs, program instructions to determine that the status corresponding to the FRUs of the plurality of FRUs is non-functional.

12. The computer program product of claim 11, further comprising:
in response to receiving at least one response to the one or more commands to change and to access another memory page from among the respective non-volatile memory devices of the plurality of FRUs, program instructions to initiate a comparison of data stored within sequential memory pages of the FRU; and
in response to determining that the comparison of data stored within sequential memory pages of the FRU indicates that the data remains the same between sequential memory pages of non-volatile memory device of the FRU, program instructions to determine that the status corresponding to the FRU is non-functional.

13. The computer program product of claim 8, further comprising:
in response to determining the status of two or more FRUs of the plurality of FRUs are non-functional, program instructions to identify locations within the computing system corresponding the two or more non-functional FRUs;
program instructions to determine a response related to the two or more non-functional FRUs, based on criteria associated the locations corresponding to the two or more non-functional FRUs and a threshold number of non-functional FRUs within the portion of the computing system;
wherein the other response related to the two or more non-functional FRUs is selected from the group consisting of: determining to disable the portion of the computing system that includes the threshold number of non-functional FRUs, determining another configuration for the portion of the computing system that includes the threshold number of non-functional FRUs, and communicating with a management program of the computing system; and program instructions to initiate one or more actions corresponding to the response related to the two or more non-functional FRUs.

14. The computer program product of claim 8, wherein the initiated action on the computer system is selected from the group consisting of: disabling the portion of the computing system, generating one or more visual indications associated with the corresponding location of the non-functional FRU, and transmitting a notification to an administrator of the computing system.

15. A computer system for managing hardware within a computing system, the computer system comprising:
   one or more computer processors;
   one or more computer readable storage media;
      program instructions to identify a plurality of field-replaceable units (FRUs) within a computing system that respectively include a non-volatile memory device;
      program instructions to determine a status corresponding to a FRU of the identified plurality of FRUs;
      in response to determining a non-functional status of the FRU of the identified plurality of FRUs, program instructions to determine a response related to the non-functional FRU; and
      program instructions to initiate an action on the computing system based on the determined response related to the non-functional FRU, wherein the initiated action is reconfiguring a portion of the computing system that includes the non-functional FRU to operate at a reduced capability.

16. The computer system of claim 15, wherein the non-volatile memory device of an identified FRU is a multi-page non-volatile memory device that stores at least vital product data (VPD) related to a FRU, and wherein the stored VPD is distributed among each memory page of the multi-page memory of the non-volatile memory device.

17. The computer system of claim 15, wherein the program instructions to determine the status corresponding to the FRU further comprise:
   program instructions to initiate a read operation to obtain data stored within a respective non-volatile memory device of the FRU utilizing a hardware bus that facilitates communication between the plurality of FRUs and a management program of the computing system; and
   in response to not obtaining data from the FRU in response to the read operation, program instructions to determine that a status corresponding to the FRU is non-functional.

18. The computer system of claim 15, further comprises:
   program instructions to broadcast, via a hardware bus that operatively couples the plurality of FRUs, one or more commands to change and to access a memory page of the respective non-volatile memory devices of the plurality of FRUs;
   program instructions to determine whether one or more responses are received from the respective non-volatile memory devices of the identified group of FRU in response to broadcasting the second one or more commands and the third one or more commands; and
   in response to failing to receive a response to the one or more commands to change and to access the memory page of respective non-volatile memory devices of the plurality of FRUs, program instructions to determine that the status corresponding to the FRUs of the plurality of FRUs is non-functional.

19. The computer system of claim 18, further comprising:
   in response to receiving at least one response to the one or more commands to change and to access another memory page from among the respective non-volatile memory devices of the plurality of FRUs, program instructions to initiate a comparison of data stored within sequential memory pages of the FRU; and
   in response to determining that the comparison of data stored within sequential memory pages of the FRU indicates that the data remains the same between sequential memory pages of non-volatile memory device of the FRU, program instructions to determine that the status corresponding to the FRU is non-functional.

20. The computer system of claim 15, further comprising:
   in response to determining the status of two or more FRUs of the plurality of FRUs are non-functional, program instructions to identify locations within the computing system corresponding the two or more non-functional FRUs;
   program instructions to determine a response related to the two or more non-functional FRUs, based on criteria associated the locations corresponding to the two or more non-functional FRUs and a threshold number of non-functional FRUs within the portion of the computing system;
      wherein the other response related to the two or more non-functional FRUs is selected from the group consisting of: determining to disable the portion of the computing system that includes the threshold number of non-functional FRUs, determining another configuration for the portion of the computing system that includes the threshold number of non-functional FRUs, and communicating with a management program of the computing system; and
   program instructions to initiate one or more actions corresponding to the response related to the two or more non-functional FRUs.

* * * * *